(12) United States Patent
Troeger et al.

(10) Patent No.: US 11,541,808 B2
(45) Date of Patent: *Jan. 3, 2023

(54) LIGHTED SOFT TOP FOR A SPORT UTILITY VEHICLE OR UTILITY TASK VEHICLE

(71) Applicant: Bestop, Inc., Louisville, CO (US)

(72) Inventors: Rick H. Troeger, Westminster, CO (US); Jose N. Vigil, Westminster, CO (US)

(73) Assignee: Bestop, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/368,504

(22) Filed: Jul. 6, 2021

(65) Prior Publication Data
US 2021/0331620 A1 Oct. 28, 2021

Related U.S. Application Data

(63) Continuation of application No. 16/851,415, filed on Apr. 17, 2020, now Pat. No. 11,084,420, which is a continuation of application No. 15/673,660, filed on Aug. 10, 2017, now Pat. No. 10,661,708.

(60) Provisional application No. 62/408,455, filed on Oct. 14, 2016, provisional application No. 62/373,097, filed on Aug. 10, 2016.

(51) Int. Cl.
*B60Q 3/51* (2017.01)
*B60J 7/12* (2006.01)
*B60Q 3/208* (2017.01)
*B60Q 3/49* (2017.01)

(52) U.S. Cl.
CPC .............. *B60Q 3/51* (2017.02); *B60J 7/1226* (2013.01); *B60J 7/1291* (2013.01); *B60Q 3/208* (2017.02); *B60Q 3/49* (2017.02)

(58) Field of Classification Search
CPC ..... B60J 7/06; B60J 7/061; B60J 7/062; B60J 7/063; B60J 7/064; B60J 7/065; B60J 7/066
See application file for complete search history.

(56) References Cited

U.S. PATENT DOCUMENTS

2008/0231071 A1* 9/2008 Causey .................... B60J 7/102
296/107.15
2009/0072165 A1* 3/2009 Townsend .................. F41J 2/02
362/232

* cited by examiner

*Primary Examiner* — Andrew J Coughlin
(74) *Attorney, Agent, or Firm* — Warn Partners, P.C.

(57) ABSTRACT

A soft top assembly for SUV/UTV vehicles having connected thereto at least one lighting source, such as a fixed light emitting diode lighting device, a rope/flexible light emitting diode lighting device, a solid fiber optic lighting device, to illuminate the interior of the vehicle. The lighting device has at least one water resistant housing that is low profile. The lighting device is also shock resistant. The lighting device has a predetermined ON/OFF feature and at least one power source is provided such as battery powered, powered by replaceable/rechargeable batteries, via connection to the vehicle by a wired harness or electrical contacts, or solar powered.

19 Claims, 8 Drawing Sheets

LIGHTED SOFT TOP FOR A SPORT UTILITY VEHICLE OR UTILITY TASK VEHICLE

CROSS-REFERENCE TO RELATED APPLICATIONS

This instant application is a continuation of U.S. patent application Ser. No. 16/851,415, filed Apr. 17, 2020, which is a continuation of U.S. patent application Ser. No. 15/673,660, filed Aug. 10, 2017, issued as U.S. Pat. No. 10,661,708, which claims the benefit of U.S. Provisional Application No. 62/373,097, Filed Aug. 10, 2016 and U.S. Provisional Application No. 62/408,455, Filed Oct. 14, 2016. The disclosures of the above applications are incorporated herein by reference.

FIELD OF THE INVENTION

The present invention relates to a roof with a lighting device for soft top vehicles.

BACKGROUND OF THE INVENTION

Foldable roof soft tops are commonly used in sport-utility vehicles (SUVs) and utility task vehicles (UTVs) for recreational purposes. The foldable roof is typically moveable between at least a sunroof position and a deployed position. When in the deployed position, the foldable roof covers the vehicle interior to protect the occupants of the vehicle from various weather conditions. When in the sunroof position, the foldable roof rotates rearward such that the vehicle essentially functions without part of the roof over the front occupant compartment, exposing the interior of the vehicle to the atmosphere. This allows the occupants of the vehicle to enjoy more favorable weather conditions while driving. Some soft tops are also completely retractable and/or can be removed from the vehicle, when desired. Other soft tops are fixed panel tops. Yet other soft tops are soft weather shield systems for a enclosing the cockpit, rear seating and/or cargo areas.

The soft top cover material is typically comprised of fabric, twill acrylic fabric, multi-layer sailcloth fabric, or any other suitable flexible material and combinations thereof. However, since it is difficult to effectively mount components to the soft top cover and to provide power sources, typical interiors of soft top vehicles often lack amenities such as lighting.

Therefore, there remains a need in the art for a soft top design with lighting. It is also essential to provide a solution that can travel with and not be damaged by folding, sliding, or otherwise moving of the soft top cover from the deployed position to the sunroof position or fully retracted position depending on the particular application.

SUMMARY OF THE INVENTION

The present invention is directed to a soft top assembly for 4-door and 2-door SUVs, UTVs, convertibles or other soft top vehicles. According to one embodiment, the soft top cover is supported by a predetermined frame that is at least partially articulatable from at least a deployed (or "closed") position to an open air (or "sunroof" or "first retracted") position. The cover attaches to a header to operably connect the soft top assembly to the windshield frame area of the vehicle. In other embodiments, the soft top cover is a fixed roof panel, cassette style, cab enclosure, removable soft top, soft weather shield system for a cockpit of a vehicle or any other soft tops of any kind. At least one lighting source is provided, preferably, a plurality of lighting devices are provided on the cover. Most preferably, the lighting source includes light emitting diodes.

The lighting device preferably has a water resistant housing that is low profile. The device is also shock resistant. The lighting device has a predetermined ON/OFF feature and at least one power source is provided. In one embodiment, an auto off feature with a predetermined time delay is provided.

In one embodiment, the lighting source includes at least one fixed LED lighting device. In another embodiment, the lighting source includes at least one rope/flexible LED lighting device. In yet another embodiment, the lighting source includes a combination of fixed LEDs and rope/flexible LEDs.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to FIGS. 1-4 generally, there is provided a soft top cover assembly shown generally at 10 with a header 4 connectable to a windshield frame shown generally at 6 area of a vehicle 8, preferably with latches attached to footman loops. In accordance with an embodiment of the present invention, at least one lighting device shown generally at 12 is affixed to the assembly 10 in at least one predetermined location depending on the application. The lighting device 12 selectively illuminates the interior of the vehicle.

Each lighting device 12 has at least one illumination portion indicated generally at 13 including at least one light source 14, preferably, at least one light emitting diode 14, most preferably, a plurality of light emitting diodes (LED) 14. While three light sources 14 are shown, it is understood that more or less than three light sources, e.g., LEDs, can be used without departing from the scope of the present invention. Each lighting device 12 also typically has at least one ON/OFF button 16. An auto off (e.g., about 10-15 minute delay) feature or mechanism is preferably provided. At least one housing shown generally at 18 is provided and operably connected to a cover 20 material and/or any other part of the soft top cover assembly, e.g., on at least one location on a front header, rear header, cross car bow(s), and/or door rail(s) and combinations thereof. The material of the cover 20 is fabric, twill acrylic fabric, multi-layer sailcloth fabric and/or any other suitable flexible material or combinations thereof. Alternatively, the cover is solid hard panel(s) that are removable or semi-rigid panel(s) or a rigid framework with soft panel insert/skin(s).

Figure 3:
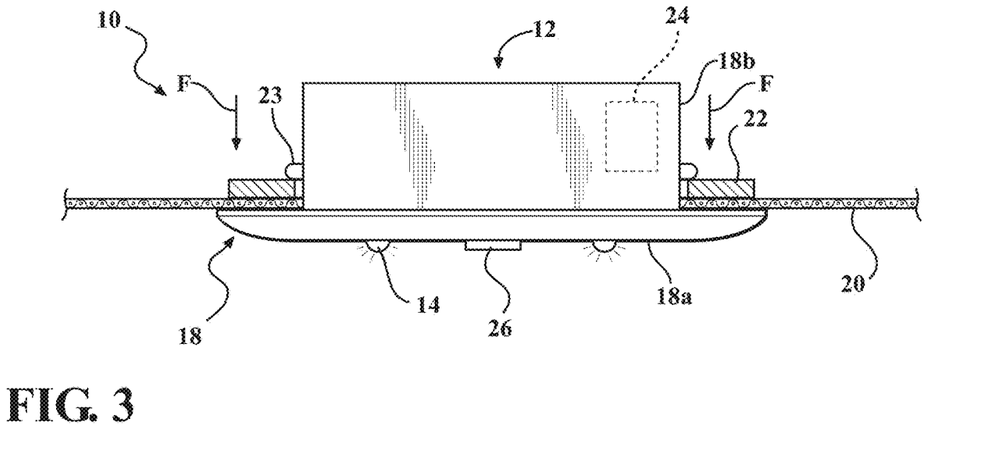
FIG. 3 is a front elevation cross-section illustrating the lighting device connected to the soft top cover, according to the present invention.
Figure 4:
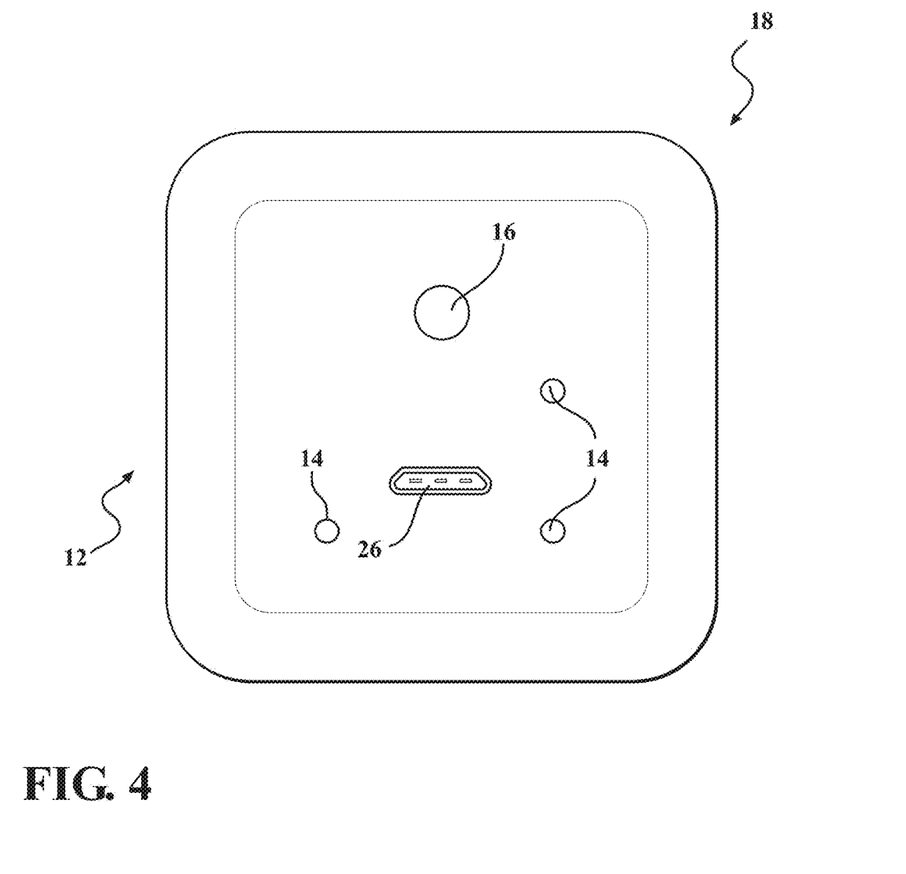
FIG. 4 is a bottom plan view of a lighting device having at least two LEDs, according to the present invention.

The housing 18 is preferably a multi-piece housing 18 with a first housing portion 18a and second housing portion 18b, and the housing 18 is operable to snap-fit the lighting device 12 to the cover 20. A snap ring 22 is provided in one embodiment that snaps below a protrusion 23 of the rear housing portion 18b upon application of load force (indicated at "F") to capture the cover 20 between the front housing portion 18a and the snap ring 22 of the rear housing portion 18b for retention. In another embodiment, the housing 18 is operably sewn to the cover 20 or fit within a pocket formed in the cover 20 leaving the LEDs 14 and ON/OFF button 16 exposed to the cabin interior. In another embodiment, the housing 18 is bonded to the cover 20 with a suitable adhesive. In yet another embodiment, the housing 18 is connected to the cover 20 by at least one fastener, snap ring(s), sewn, tongue and loop, and/or adhesive(s), adhesive strips, and combinations thereof. The first housing portion 18a has a length and width of generally about 150 to 150 mm, typically, about 125 to 125 mm, preferably 100 to 100 mm. Alternative housing 18 shape and dimensions are contemplated depending on the application without departure from the scope of the present invention.

The housing 20 is also a low profile housing to keep headspace and clear views out at an optimum. Preferably, the housing 20 is a predetermined thermoplastic material. The housing 20 is also water resistant and shock resistant. The housing 18 is operably sized depending on the application and holds the predetermined number of lighting devices 12, e.g., one lighting device or at least two lighting devices.

The lighting device 12 has at least one power source, such as at least one battery 24 system, solar power device or any other power source and combinations thereof suitable for powering the LEDs 14 and any other features of the lighting device 12. The power source 24 preferably incorporates a replaceable battery or a rechargeable battery.

In one preferred embodiment, the lighting device 12 also has at least one universal serial bus (USB) port 26 or a USB hub with a plurality of ports. Preferably, the USB port 26 is a micro USB recharge.

Figure 5:
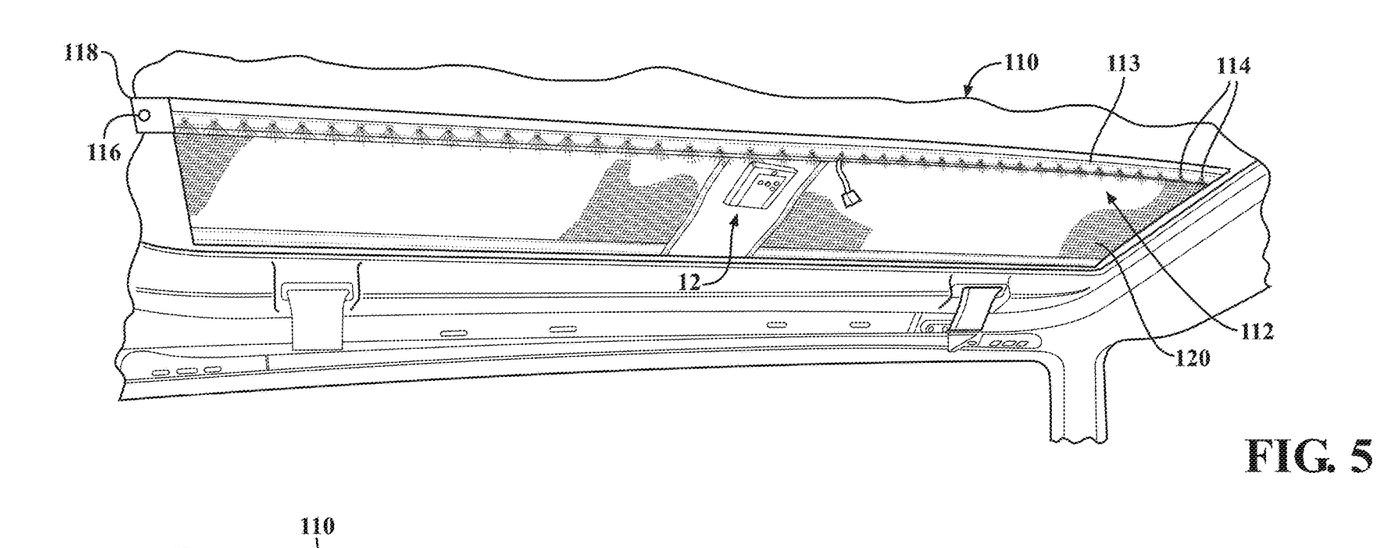
FIG. 5 is a perspective view of a lighting device in an illuminated state, the lighting device connected to an interior facing surface of a soft top cover, depicted in a closed position, connected to a vehicle, and being a flexible rope type with LEDs, in accordance with another embodiment of the present invention.
Figure 6:
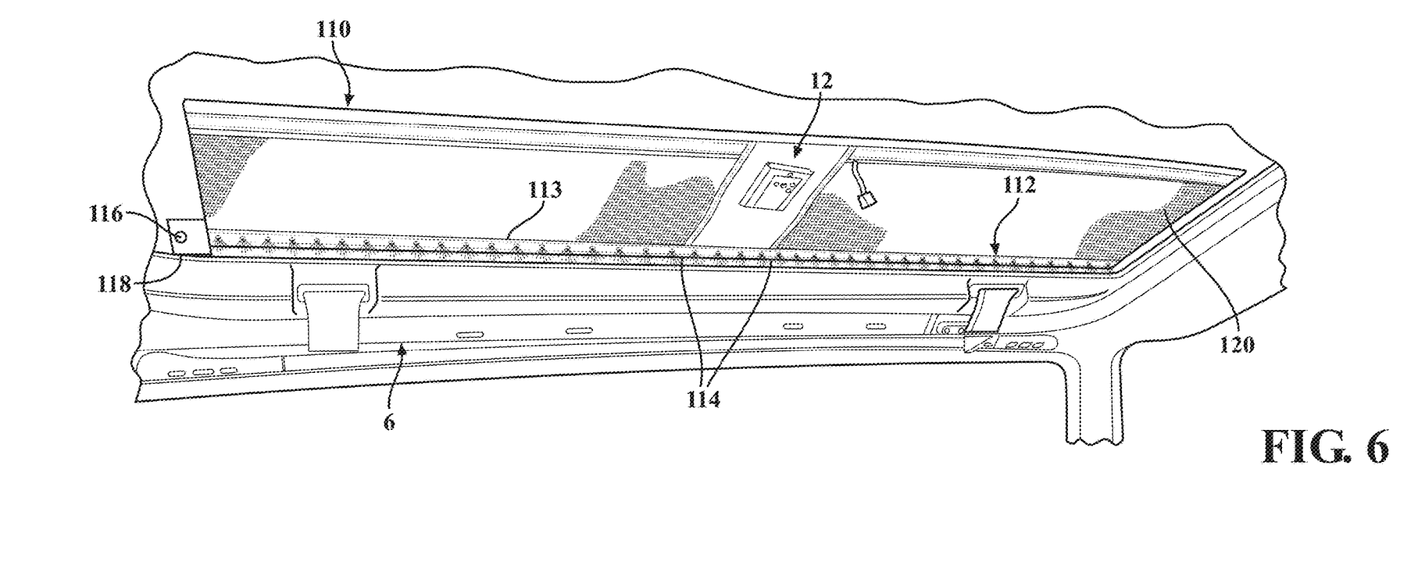
FIG. 6 is a perspective view of the lighting device of FIG. 5 depicted connected to the soft top cover in a location nearer the windshield frame, in accordance with another embodiment of the present invention.

Referring now to FIGS. 5-6 generally, there is provided a soft top cover assembly shown generally at 110 with at least one lighting device shown generally at 112 connected to the assembly, in accordance with another embodiment of the present invention. In this embodiment, each lighting device 112 has at least one illumination portion 113 that is a flexible rope with at least one light source 114, preferably, a plurality of LEDs 114. An ON/OFF power button 116 is provided on a power source 118 that is connected to the illumination portion 113. Preferably, the power button 116 is on a rechargeable battery pack 118 which is located on an end of the illumination portion 113. However, other power sources, e.g., solar, and locations for the power source 118 relative to the illumination portion 113 are contemplated depending on the application without departure from the scope of the present invention. An auto off (e.g., about 10-15 minute delay) feature or mechanism is preferably provided.

At least one illumination portion 113 is operably connected to the cover 120 in predetermined location(s). FIGS. 5-6 illustrate LED light ropes sewn to the deck material. FIG. 5 is a sewn in flexible light toward the rear of the front passenger compartment, and, FIG. 6 is a sewn in flexible light toward the front adjacent the header of the cover 110 adjacent the windshield frame 6 region.

The flexible illumination portion 113 is generally tubular or of generally circular cross section or can be a flexible strip depending on the application without departure from the scope of the present invention.

The lighting device 112 is generally about 5 to 45 inches long, typically, about 20-45" long, preferably, at least about 40" long, most preferably, 40-42" long.

The cover 120 has at least one lighting device, e.g., at least one rope/flexible LED lighting device 112. Alternatively, at least one lighting rope/flexible LED lighting device 112 in combination with at least one fixed LED lighting device 12, and/or solar powered lighting device, and any combinations thereof).

Figure 7A:
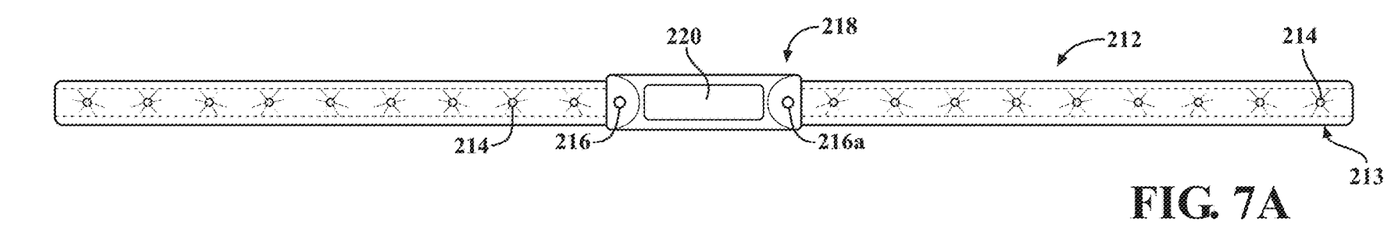
FIG. 7A is a bottom plan view of a lighting device, according to an embodiment of the present invention.
Figure 7B:
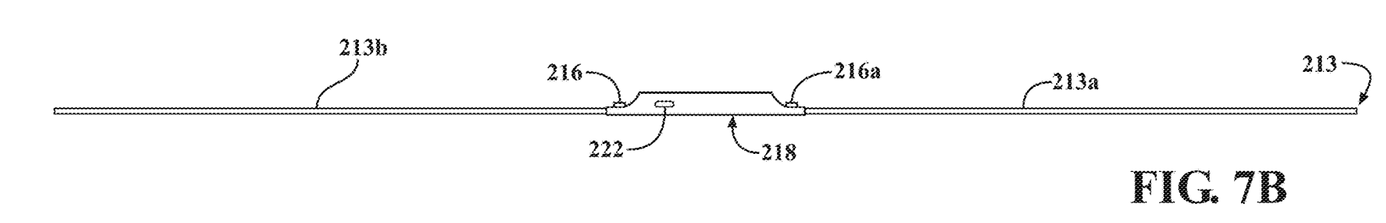
FIG. 7B is a side elevation view of FIG. 7A.

Referring to FIGS. 7A-7B generally, there is provided at least one lighting device shown generally at 212 for the soft top cover assembly 110 (i.e., operably connected to a predetermined location on the cover 120 interior depicted in FIGS. 5-6 in addition to lighting device 112 or rather than lighting device 112), in accordance with another embodiment of the present invention. In this embodiment, each lighting device 212 has at least one illumination portion 213 that is a flexible strand with a plurality of light sources 214, preferably, a plurality of LEDs 214. The illumination portion 213 is operably connected to the cover 120 at a predetermined location, e.g., sewn in at any of a plurality of locations of the soft cover, connected in locations depicted in FIGS. 5-6, and/or adhered, bonded, fastened or otherwise suitably connected to any other part of the soft top cover assembly 110 such as on a front header, rear header, cross car bow(s), and/or door rail(s) and any combinations thereof.

Each lighting device 212 also typically has at least one ON/OFF button 216. An auto off (e.g., about 10-15 minute delay) feature is preferably provided. At least one housing shown generally at 218 is provided and operably connected to the cover 220 material or header 4 (e.g., adhesive and/or sewn and/or base placed inside a pocket or cutout, using a snap-ring, as set forth previously, etc). This housing 218 has the ON/OFF button(s) 216. In a most preferred embodiment, there are two ON/OFF buttons 216,216a provided on the housing 218, each ON/OFF button 216,216a controlling a respective half of the illumination portion 213. The first ON/OFF button 216 controls a first half 213b of the illumination portion 213 and the second ON/OFF button 216a controls a second half 213a of the illumination portion 213. By way of example, a driver can use the first ON/OFF button 216 to illuminate the first half 213b over the driver side of the vehicle. The second ON/OFF button 216a can be left off or can additionally be used to illuminate the second half 213b over the passenger side of the vehicle, or vice versa. An auto off (e.g., about 10-15 minute delay) feature or mechanism is preferably provided.

According to an embodiment of the present invention, the lighting device 212 has at least one solar panel 220 operably connected to the housing 218 as a power source. Alternatively, the power source is a battery, such as a replaceable battery or a rechargeable battery. The housing 218 preferably has a micro USB recharge 222. The lighting device 212 most preferably is a solar LED device with at least one solar panel 220 exposed to at least the cabin interior when in the closed position (and to the open air when in an open sunroof position, depending on the application).

The material of the cover 220 is fabric, twill acrylic fabric, multi-layer sailcloth fabric and/or any other suitable flexible material or combinations thereof. Alternatively, the cover is solid hard panel(s) or semi-rigid panel(s) or a rigid framework with soft panel insert/skin(s), etc.

The lighting device 212 is generally about 5 to 45 inches long, typically, about 20-45" long, preferably, at least about 40" long, most preferably, 40-42" long. Shorter or longer ropes 213 are contemplated without departure from the present invention. The cover 220 has at least one lighting device (at least one rope/flexible LED 212, and, alternatively, at least one lighting rope/flexible LED 212 in combination with at least one fixed LED 12 and/or in combination with at least one flexible strand 213). LED strips, e.g., singularly arranged or arranged end-to-end or side-by-side and combinations thereof, are also contemplated depending on the application without departure from the present invention.

Figure 8:
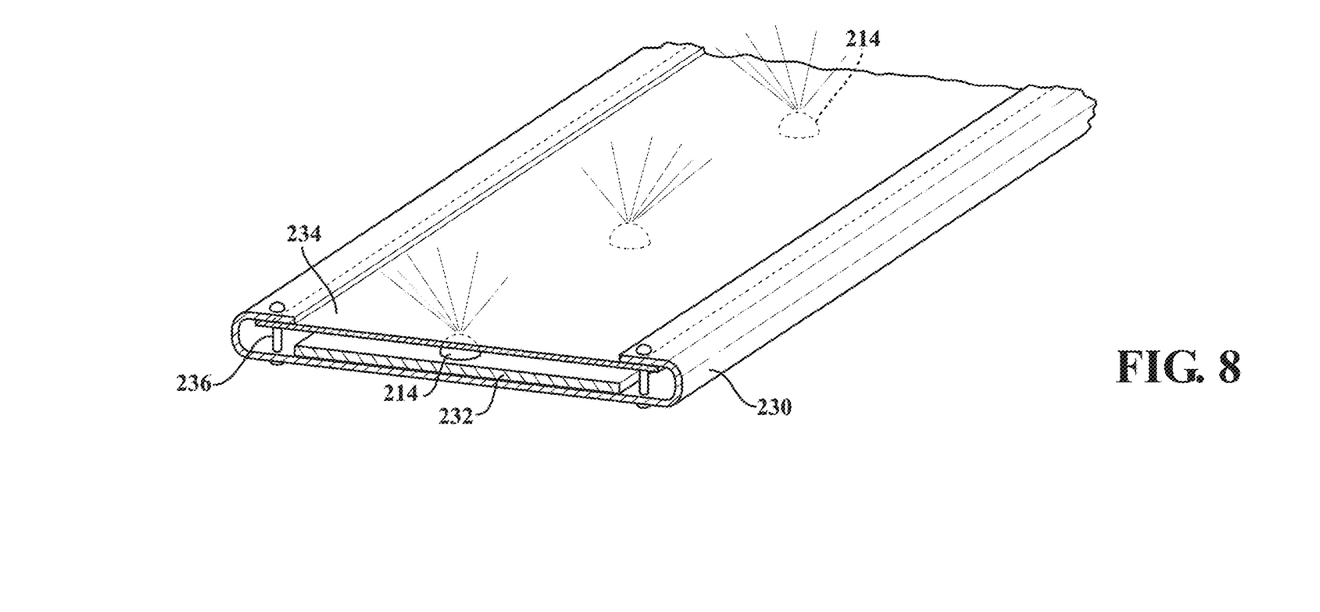
FIG. 8 is a perspective cross-sectional view of the lighting device of FIG. 7, according to the present invention.

Referring to FIG. 8 generally, there is shown a cross sectional view of the illumination portion 213 for attachment to the cover 220 using at least one web strap 230. There is provided at least one LED strip 232 overlaid by at least one layer 234 of material, e.g., a clear film, a white film, acrylic sheet, or any other suitable translucent or transparent material, etc. Other materials 234 are contemplated depending on the particular application without departing from the scope of the present invention. The web strap 230, e.g., polyester web strap, is wrapped around the bottom surface of the LED strip 232 and part way across the top surface of the overlay layer 234, leaving the area for transmission from the light sources 214 exposed to illuminate the vehicle interior, and operably fastened in place by a plurality of fasteners 236 through the web strap 230 and layer 232 with the LED strip 232 therebetween. Alternatively, the fasteners 236 also extend through the LED strip 213. It is understood that fasteners, sewing, adhesive, etc and combinations thereof can be used to connect the web strap 230 to the strip 232, layer 234 depending on the application without departure from the scope of the present invention.

Figure 1:
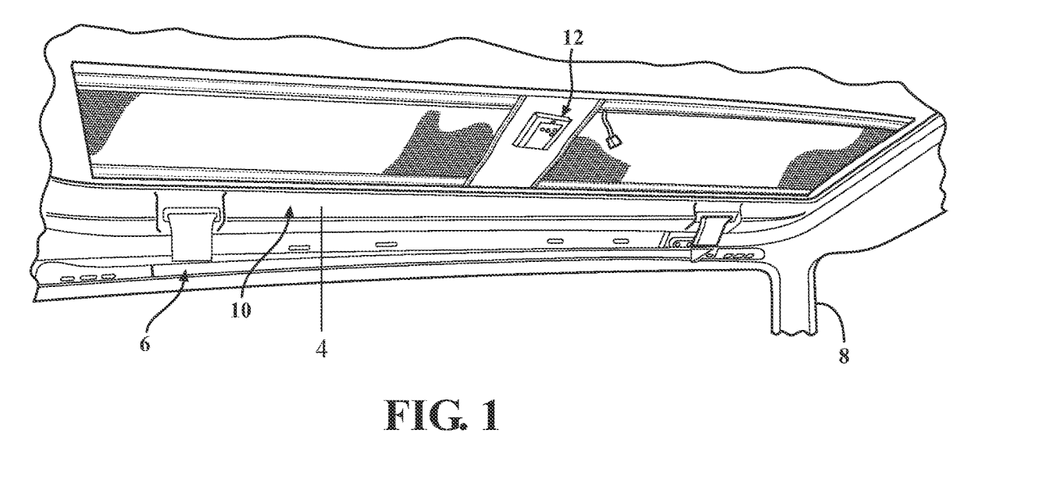
FIG. 1 is a perspective view of a lighting device, the lighting device being connected to an interior facing surface of a soft top cover connected to a vehicle depicted in a closed position and having a plurality of fixed LEDs mounted to a housing, according to an embodiment of the present invention.
Figure 2:
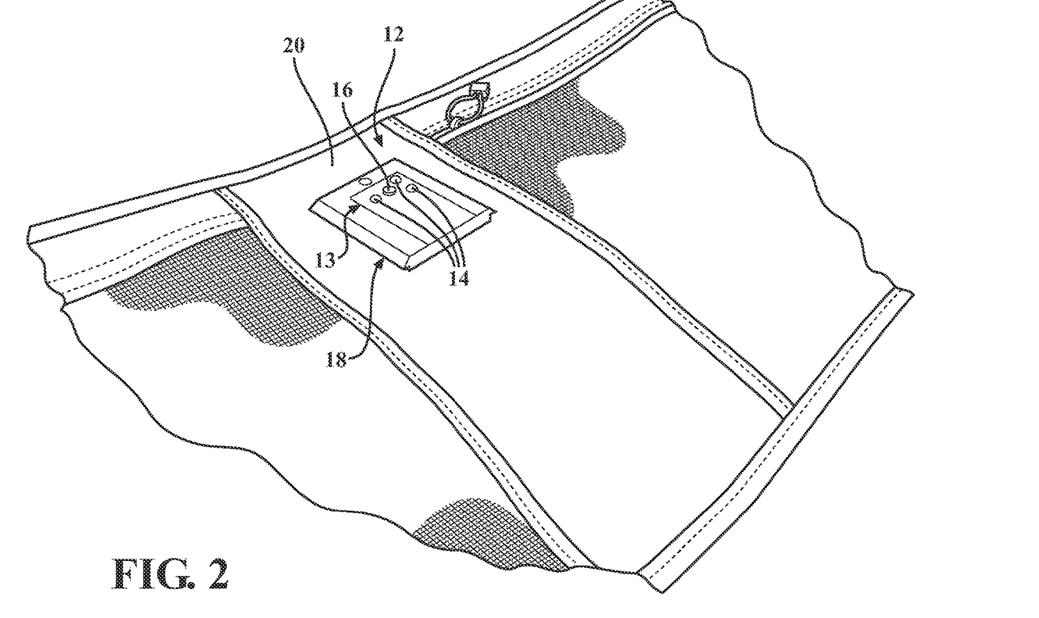
FIG. 2 is an enlarged perspective view of the lighting device of FIG. 1 connected to the soft top cover, with the header removed for clarity, in accordance with the present invention.
Figure 9:
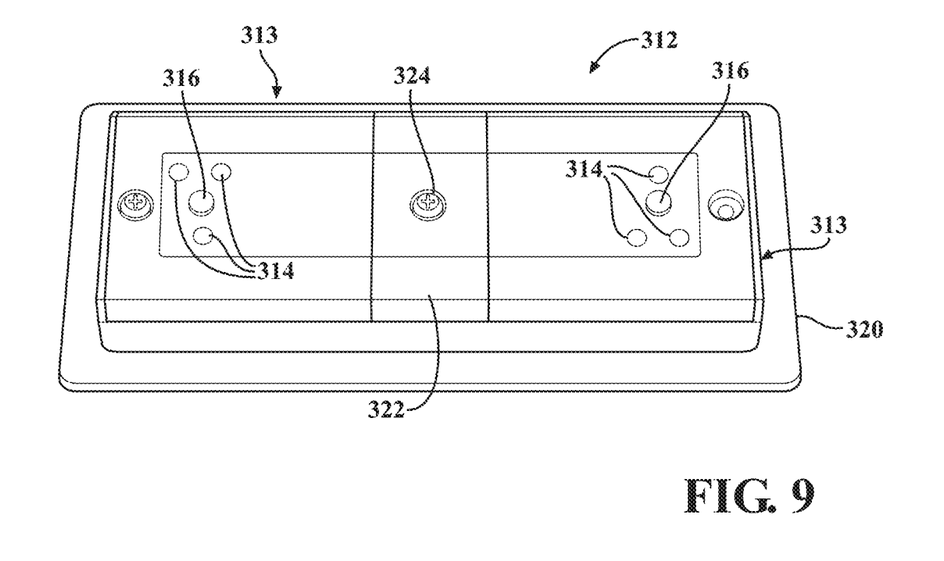
FIG. 9 is a perspective view of a lighting device incorporating at least two removable lights, according to another embodiment of the present invention.
Figure 10:
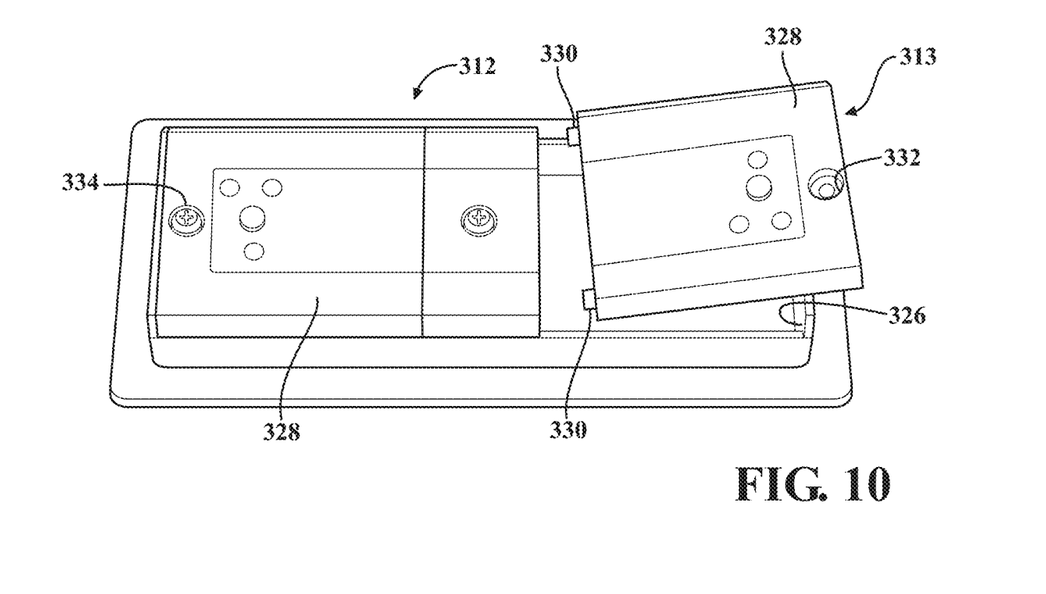
FIG. 10 is a perspective view of the lighting device of FIG. 9 depicting one of the lights being removed from a housing, according to the present invention.
Figure 11:
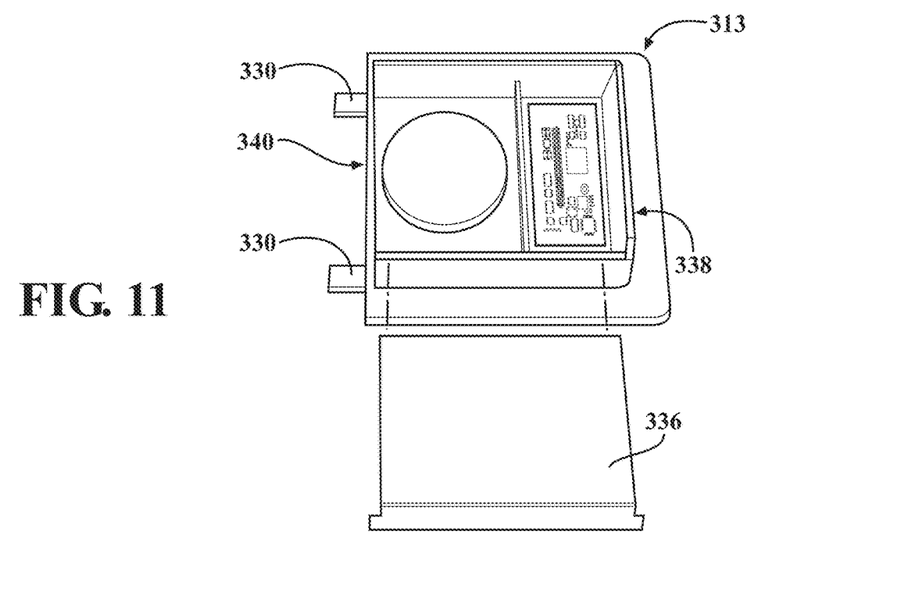
FIG. 11 is a bottom perspective view of the removed light of FIG. 10 with a rear housing panel removed; according to the present invention.

Referring now to FIGS. 9-11 generally, according to another embodiment of the present invention, there is provided at least one lighting device shown generally at 312 of a soft top cover assembly for connecting to at least one predetermined location, respectively, of the soft top cover assembly (i.e., connected to the cover 20 or header 4 of the soft top cover assembly 10 depicted in FIG. 1) to selectively illuminate the interior of the vehicle. Each lighting device 312 includes at least two illumination portions shown generally at 313, each with at least one lighting source 314, e.g., fixed LEDs, preferably, a plurality of LEDs 314. While three light sources 314 are shown for each illumination portion 313, it is understood that more or less than three light sources, e.g., LEDs, can be used depending on the application without departing from the scope of the present invention. Further, it is understood that the lighting device 312 is adaptable to accommodate more than two illumination portions 313 depending on the application without departing from the scope of the present invention.

Each lighting device 312 also typically has at least one ON/OFF button 316. An auto off (e.g., about 10-15 minute delay) feature or mechanism is preferably provided. Preferably, each illumination portion 313 has its own ON/OFF button 316,316 to selectively turn either portion on/off at different times. At least one housing shown generally at 318 is provided. The housing 318 is integrally formed or is integrated with multiple housings, e.g., such as a base 320 and upper housing 322, fastened together with at least one fastener 324. The housing 318 is operably connected to the header 4 of the assembly 10 and/or cover material 20 and/or any other part of the soft top cover assembly, e.g., on at least one location on a front header, rear header, cross car bow(s), and/or door rail(s) and combinations thereof.

The illumination portions 313 are selectively removable for replacement, repair or maintenance. The housing 318 has at least two chambers 326 to receive a body 328 of the illumination portions 313, respectively. At least two tabs 330 on the end of each illumination portion 313 are received within notches formed in the housing 318 and the illumination portion body 328 fits into the chamber 326. At least one aperture 332 is provided in the body 328 to receive a fastener 334 to connect the other end of each illumination portion 313 body 328 to the housing 318.

The removable lights 312 each have at least one power source. The power source is preferably a battery, such as a replaceable battery or a rechargeable battery. In another embodiment, a solar power device is provided. In yet another embodiment, the power source is a replaceable battery or a rechargeable battery in combination with a solar panel.

In one embodiment, at least one universal serial bus (USB) port or a USB hub with a plurality of ports is also provided.

FIGS. 9-10 generally depict a lighting device 312 assembly having an outer housing 318 with a double light member 313 that is removable (alternatively, fixed), operably connected to the outer housing 318. FIG. 10 illustrates the illumination portion 313 in the process of being removed. FIG. 11 illustrates the back of the illumination portion 313 having a servicing panel 336 removed exposing the circuitry, shown generally at 338, and power source, indicated generally at 340, of the illumination portion 313.

Figure 12:
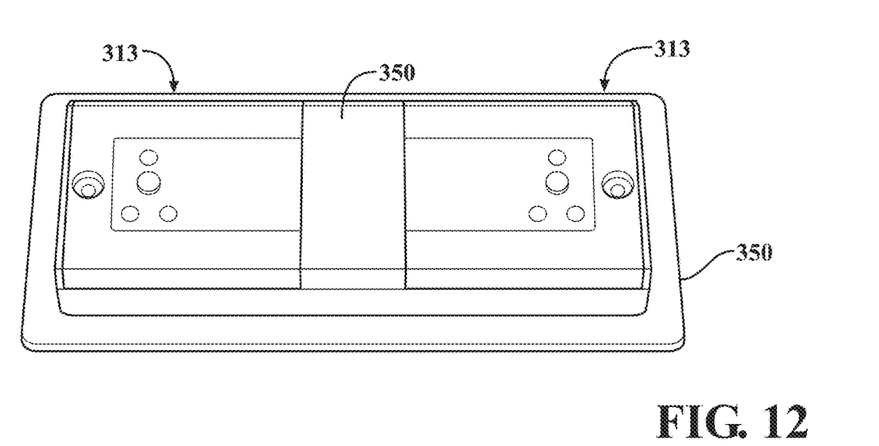
FIG. 12 is a perspective view of a lighting device incorporating at least two lighting portions, according to an embodiment of the present invention.

FIG. 12 is identical to FIG. 9, however, the base 350 and upper housing 322 are integrally formed.

Figure 13:
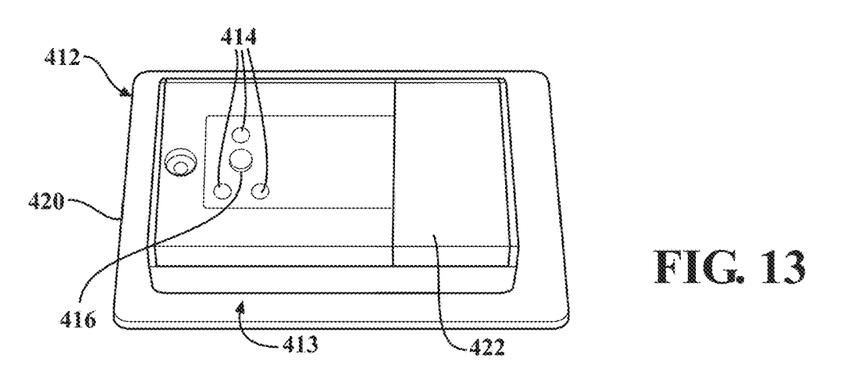
FIG. 13 is a perspective view of a lighting device incorporating a single illumination unit, according to another embodiment of the present invention.

Referring now to FIG. 13 generally, there is shown a lighting device 412 of a soft top cover assembly (i.e., where the device is connected to the cover 20 or header 4 of the soft top cover assembly 10 depicted in FIG. 1) that incorporates a single illumination portion shown generally at 413, in accordance with another embodiment of the present invention. The illumination portion 413 has at least one lighting source 414, e.g., fixed LEDs, preferably, a plurality of LEDs 414. While three light sources 414 are shown, it is understood that more or less than three light sources, e.g., LEDs, can be used depending on the application without departing from the scope of the present invention.

The illumination portion 413 also typically has at least one ON/OFF button 416. An auto off (e.g., about 10-15 minute delay) feature or mechanism is preferably provided.

At least one housing shown generally at 418 is provided with multiple housings, e.g., such as a base 420 and upper housing 422, fastened together with at least one fastener or that are integrally formed. The base 420 is operably connected (e.g., adhesive and/or sewn and/or base 420 placed inside a pocket or cutout, using a snap-ring as set forth previously, etc) to the header 4 of the assembly 10 and/or cover material 20 and/or any other part of the soft top cover assembly, e.g., on at least one location on a front header, rear header, cross car bow(s), and/or door rail(s) and combinations thereof.

The illumination portion 413 includes a plurality of tabs 330 that are received within notches formed in the housing and the illumination portion 413 fits into the chamber of the housing, as set forth previously and identical to FIG. 10, and is connected to the housing by at least one fastener 424. The illumination portion 413 is selectively removable for replacement, repair or maintenance.

The illumination portion 413 has at least one power source. The power source is preferably a battery, such as a replaceable battery or a rechargeable battery. In another embodiment, a solar power device is provided. In yet another embodiment, the power source is a replaceable battery or a rechargeable battery in combination with a solar panel.

In one embodiment, at least one universal serial bus (USB) port or a USB hub with a plurality of ports is also provided.

Figure 14:
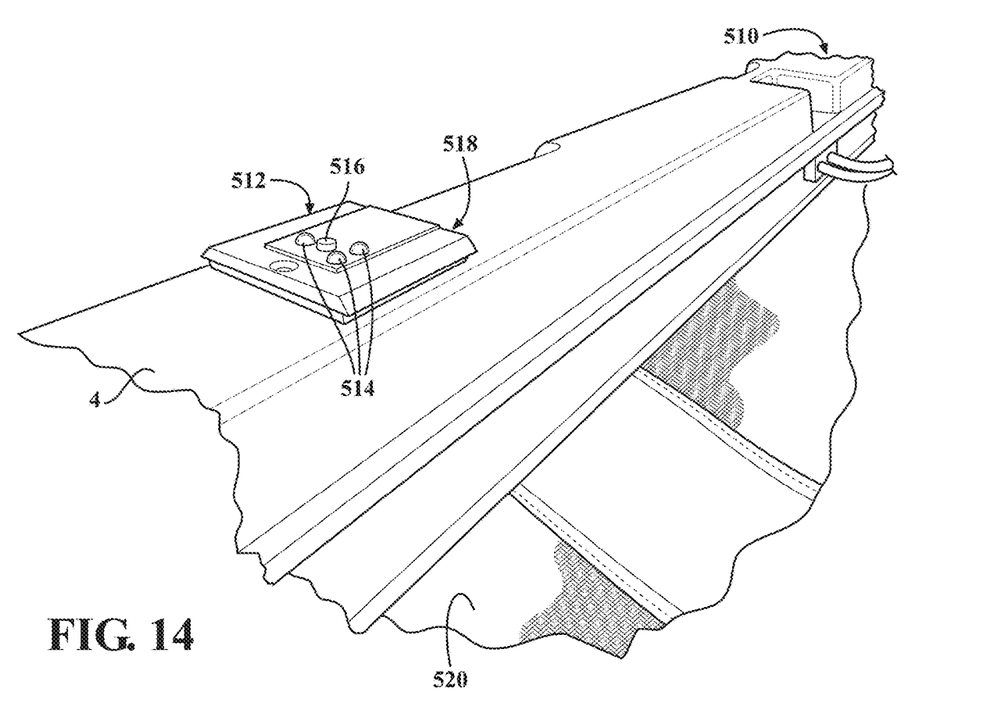
FIG. 14 is a perspective view of a lighting device including fixed LEDs, the lighting device depicted connected to a header of a soft top cover for a vehicle, according to another embodiment of the present invention.

Referring now to FIG. 14 generally, there is shown another embodiment having at least one lighting device depicted generally at 512 operably connected to the header 4 of the soft top cover assembly indicated generally at 510. The lighting device is inserted in or attached to the header 4. The lighting device 512 includes at least one illumination portion 513 that has at least one lighting source 514, e.g., fixed LEDs, preferably, a plurality of LEDs 514. The illumination portion 513 also typically has at least one ON/OFF button 516. An auto off (e.g., about 10-15 minute delay) feature or mechanism is preferably provided.

At least one housing shown generally at 518 is provided and operably connected, e.g., by at least one fastener and/or adhesive and/or snap ring, to the header 4. According to one embodiment, the housing 518 is adhered or fastened to the header 4 of a cover 520. In another embodiment, the housing 518 is partially inserted into the header 4 and fastened thereto. In one embodiment, the housing 518 is operable to snap-fit the lighting device 512 to the header. Similarly as set forth previously and depicted in FIG. 3, a snap ring 22 is provided that snaps below a protrusion 23 of a rear housing portion of the housing 518 upon application of load force, however, it is the header 4 wall which captured between the front housing portion and the snap ring 22 of the rear housing portion for retention.

The lighting device 512 has at least one power source, such as at least one battery 24 system, solar power device or any other power source and combinations thereof suitable for powering the LEDs 514 and any other features of the lighting device 512. The power source preferably incorporates a replaceable battery or a rechargeable battery.

In one preferred embodiment, the lighting device 512 also has at least one universal serial bus (USB) port 26 or a USB hub with a plurality of ports.

While one lighting device 512 is depicted connected to the header 4, it is understood that at least two lighting devices 512 can be used and connected to the header 4 (or any other location the front header, rear header, cross car bow(s), cover, and/or door rail(s), or any other location, and combinations thereof).

Figure 15:
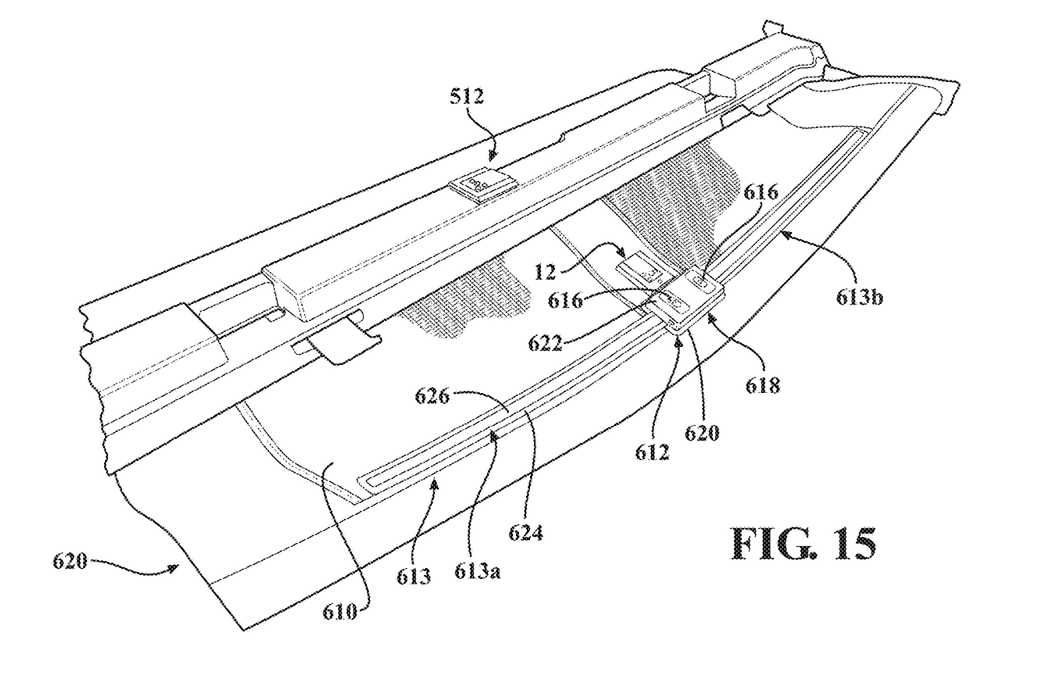
FIG. 15 is a perspective view of a plurality of lighting devices connected to a soft top cover for a vehicle, including a first lighting device connected to a header of the cover and incorporating fixed LEDs, a second lighting device connected to the cover and incorporating fixed LEDs, and a third lighting device connected to the cover incorporating flexible light strips, according to another embodiment of the present invention.

Referring now to FIG. 15 generally, there is provided at least one lighting device shown generally at 612 operably connected to a soft top cover assembly shown generally 620, in accordance with another embodiment of the present invention. The lighting device 612 has at least one illumination portion shown generally at 613 that incorporates at least one flexible lighted strip 626 having a plurality of light sources, preferably, LEDs, within the strips. Preferably, at least one flexible lighted strip of material, e.g., clear or translucent film or casing, with LEDs is used. At least one ON/OFF power button 616. An auto off (e.g., about 10-15 minute delay) feature or mechanism is preferably provided, according to an embodiment of the invention.

The illumination portion 613 has at least one flexible lighted strip 626 connected to a housing shown generally at 618. Preferably, the illumination portion 613 has a first half 613*a* controlled by one power source button 616 and a second half 613*b* controlled by another power source button 616. The first half 613*a* and second half 613*b* are operably connected to at least one housing 618 having the ON/OFF power buttons 616,616. The housing 618 has a base 620 and upper housing 622 operably connected to the assembly 620. Preferably, a power source that is a replaceable or rechargeable battery located within the housing 618 is provided. However, other power sources, e.g., solar, and locations for the power source relative to the illumination portion 613 are contemplated depending on the application without departure from the scope of the present invention. Alternatively, the lighting device 612 has a single flexible strip 626 light source connected to the housing 618 to form the lighting device 612.

The illumination portion 613 preferably has a web strip 624 operably connected to the cover 620 of the assembly 610. Preferably, the web strip is nylon or polyester. The flexible strip 626 light source is operably connected to the web strip 624, e.g., sewn and/or bonded with a suitable adhesive, or connected by at least one fastener, snap ring(s), sewn, tongue and loop, and/or adhesive strips, or other suitable connection or combinations thereof.

The lighting device 612 is generally about 5 to 45 inches long, typically, about 20-45" long, preferably, at least about 40" long, most preferably, 40-42" long.

At least one lighting device 612 is connected to the assembly 620, preferably to the cover 610. However, the lighting device 612 is adaptable for connection to any of a plurality of predetermined location, e.g., on at least one location on a front header, rear header, cross car bow(s), and/or door rail(s) and combinations thereof.

Optionally, at least one additional lighting device is provided. FIG. 15 depicts a lighting device 512 connected to the header 4 and light device 12 connected to the cover 610, as described previously, where like numbers indicate like parts. However, at least one of any of the aforementioned lighting devices and any predetermined locations within the interior of the vehicle is contemplated without departure from the present invention, e.g., front header, rear header, cross car bow(s), fabric management bows, door rail(s), pivotal sunroof frame portions, sport bars, center cross member, and/or cover material and combinations thereof. While three lighting devices are shown, it is understood that more or less than three lighting devices, and any of a variety of combinations of lighting devices, are contemplated depending on the application without departure from the scope of the present invention.

Figure 16:
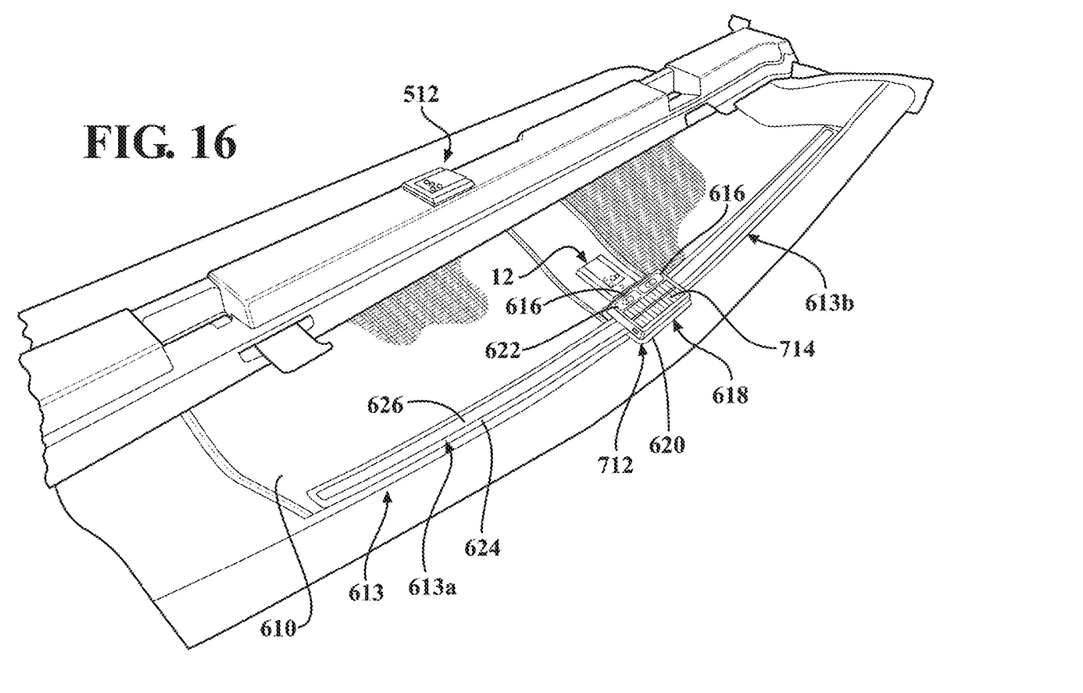
FIG. 16 is a perspective view of a lighting device incorporating flexible light strips and a solar device, in accordance with another embodiment of the present invention.

Referring now to FIG. 16 generally, where like numbers indicate like parts, as set forth previously, there is provided at least one lighting device shown generally at 712 that incorporates solar power, in accordance with another embodiment of the present invention. At least one solar 714 is operably incorporated with the housing 618 to power the lighting device 712.

Optionally, at least one additional lighting device is provided. FIG. 16 depicts a lighting device 512 connected to the header 4 and light device 12 connected to the cover 610, as described previously, where like numbers indicate like parts. However, at least one of any of the aforementioned lighting devices and any predetermined locations within the interior of the vehicle is contemplated without departure from the present invention, e.g., front header, rear header, cross car bow(s), fabric management bows, door rail(s), pivotal sunroof frame portions, sport bars, center cross member, and/or cover material and combinations thereof. While three lighting devices are shown, it is understood that more or less than three lighting devices, and any of a variety of combinations of lighting devices, are contemplated depending on the application without departure from the scope of the present invention.

Figure 17:
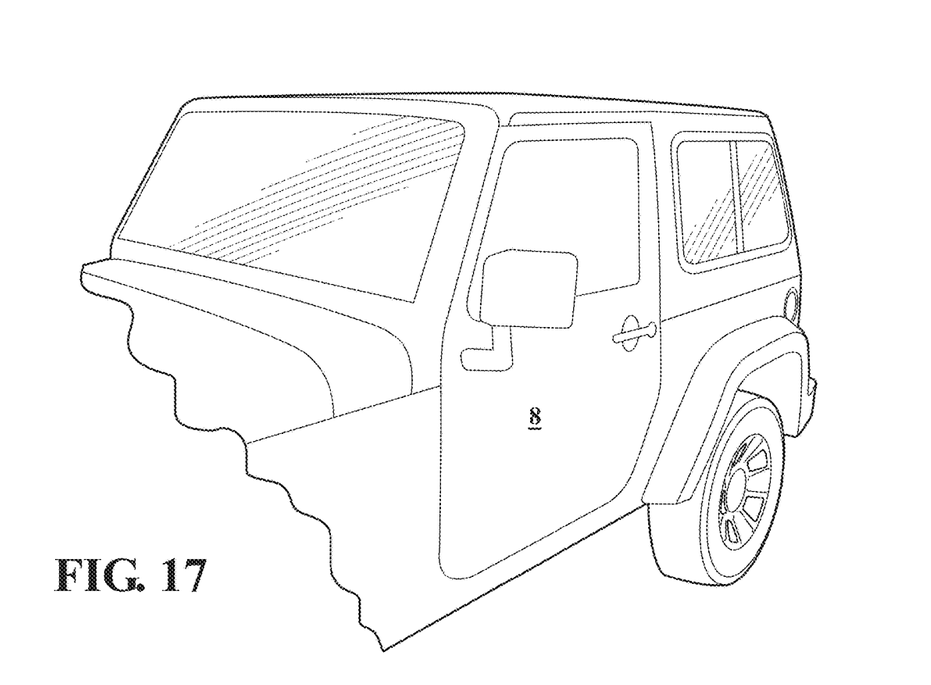
FIG. 17 is a perspective view of a soft top cover assembly connected to a vehicle.

FIG. 17 depicts an exemplary vehicle 8 with a soft top cover assembly (e.g., 10, 110, 510, 620) connected to the vehicle.

Referring to the figures generally, the cover is operably coupled to the header, according to an embodiment of the present invention. Preferably, the soft panel top assembly is secured to a windshield frame with quick release latches. Any other alternative attachment location and features depending on the application are contemplated without departing from the scope of the present invention. Preferably, the soft panel top assembly is secured at the rear to a rear header or rear bow. The soft panel top assembly is preferably moveable between at least a closed, latched position and an open, sunroof position, according to an embodiment of the present invention. The soft panel top assembly covers the rear passenger compartment, according to an embodiment of the present invention. While some of the drawings generally depict the cover region over the front cockpit compartment, it is understood that any embodiment can be adapted to incorporate attachment in the rear passenger compartment and/or cargo area. In general, there is provided a soft top cover assembly including at least one lighting device, in accordance with any embodiment of the present invention. The soft top assembly preferably includes a pivotal sunroof portion connected to a linkage assembly or other structure for rotation such that the cover is moveable between an open and closed position. While a soft top is described, it is understood that the present invention is not limited to a soft top only. The top can be a folding/stowable soft top, sunroof soft top, folding/slidable soft top, front/rear/cargo roof soft top, front cockpit cover, rear passenger cover, cargo cover, fixed roof panels, hard top panels, front and/or rear hard top, 3-piece hardtop, cassette style, cab enclosure, removable soft top, sunroof shade, shade, soft weather shield system for enclosing a cockpit, rear seating and/or cargo areas of a vehicle, slant back soft top, or any other tops of any kind needing interior lighting without departure from the present invention.

Referring to the figures generally, incorporating a predetermined fixed frame or a frame for articulation the cover 20, 120, 520, 610 to at least the sunroof position and attachment to the vehicle and/or weather resistant sealing engagement with the vehicle (e.g., sport bars and/or rear header, bow(s), and/or hard top, etc.) is within the scope of the present invention.

The 2-door and 4-door descriptions described herein are not limiting. It is understood that any embodiment, and combinations thereof, described herein can be modified and is/are utilizable on any convertible, 2-door or 4-door SUV vehicle, UTV, etc.

In one embodiment, the lighting source includes at least one fixed LED lighting device. In another embodiment, the lighting source includes at least one rope/flexible LED lighting device. In another embodiment, the lighting source includes at least one flexible LED strip lighting device. In yet another embodiment, the lighting source includes a combination of fixed LEDs and/or rope/flexible LEDs and/or flexible LED strips. Other lighting sources are contemplated depending on the particular SUV/UTV/other vehicle application without departing from the scope of the present invention.

In any of the aforementioned embodiments, more than one light setting, when desired, is contemplated without departure from the present invention, e.g., at least a low intensity and high intensity selection. Colored LEDs and combinations of different color LEDs are also contemplated without departure from the present invention. Incorporating additional electronics, navigation, communication, storage, etc into the lighting device unit or housing is also contemplated without departure from the present invention.

In any of the aforementioned embodiments, preferably all are battery powered and/or receive power by replaceable/rechargeable batteries and/or a connection to the vehicle via a wired harness or electrical contacts in the assembly that make contact when closing the soft top assembly sunroof feature.

In any of the aforementioned embodiments, replacing the LED style point lights with a solid fiber optic style element is contemplated without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A soft top assembly with lighting adapted for a vehicle, comprising:
    at least one lighting device operably connected to at least one predetermined location on the soft top assembly to selectively illuminate the vehicle interior, said at least one lighting device including at least one illumination portion with at least one light source that illuminates the vehicle interior when powered on; and
    a flexible overhead cover, said at least one lighting device including at least one housing operably connected to said flexible overhead with at least one snap ring.

2. The soft top assembly with lighting of claim 1, further comprising a header operably connected to the flexible overhead cover, wherein another lighting device is operably connected to the header.

3. The soft top assembly with lighting of claim 1, wherein the at least one lighting device is sewn and/or bonded with adhesive to the soft top assembly.

4. The soft top assembly with lighting of claim 1, wherein each illumination portion of the at least one lighting device includes a plurality of light sources that are a plurality of fixed light emitting diodes or solid fiber optics.

5. The soft top assembly with lighting of claim 1, comprising at least two of the illumination portions, wherein each illumination portion includes at least one light source.

6. The soft top assembly with lighting of claim 5, wherein the at least one light source is a plurality of fixed light emitting diodes.

7. The soft top assembly with lighting of claim 5, wherein each illumination portion includes a flexible strip, and wherein the at least one light source is a plurality of flexible light emitting diodes operably connected to the flexible strip.

8. The soft top assembly with lighting of claim 1, wherein each lighting device is a fixed light emitting diode device with a plurality of light sources that are light emitting diodes.

9. The soft top assembly with lighting of claim 1, wherein each lighting device is a flexible rope light emitting diode device with a plurality of light sources that are light emitting diodes.

10. The soft top assembly with lighting of claim 1, wherein the at least one housing is a water resistant low profile housing containing a plurality of light emitting diodes.

11. The soft top assembly with lighting of claim 1, wherein the at least one lighting device further comprises at least one ON/OFF feature to selectively turn the lighting device ON/OFF.

12. The soft top assembly with lighting of claim 11, wherein the at least one ON/OFF feature includes an ON/OFF button and incorporates an auto off having a predetermined timed delay mechanism to automatically power the lighting device off.

13. The soft top assembly with lighting of claim 12, wherein the timed delay is about 10-15 minutes.

14. The soft top assembly with lighting of claim 1, wherein the at least one lighting device further comprises at least one power source selected from the group consisting of a replaceable battery, a replaceable/rechargeable battery, a solar panel and combinations thereof.

15. The soft top assembly with lighting of claim 1, wherein the at least one lighting device further comprises at least one charging port.

16. The soft top assembly with lighting of claim 1, wherein the at least one housing includes at least one protrusion and the snap ring adapted to operably connect the at least one lighting device to the flexible overhead cover using the snap ring positioned relative to the at least one protrusion to hold the flexible overhead cover between a housing portion and the at least one protrusion.

17. The soft top assembly with lighting of claim 1, further comprising at least one flexible web strip sewn and/or bonded with adhesive to a cover of the assembly, said at least one flexible web strip including a plurality of light emitting diodes operably connected to the flexible web strip.

18. The soft top assembly with lighting of claim 1, wherein the lighting device is a rope/flexible light emitting diode device that is sewn into a cover of the soft top assembly.

19. The soft top assembly with lighting of claim 18, wherein the lighting device further comprises:
    at least one LED strip of a plurality of LEDs;
    at least one web strap; and
    at least one film strip overlaying the LED strip;
    wherein the web strap is wrapped around a bottom of the LED strip and partly over the top of the film strip and operably fastened to the film strip to allow light transmission from the plurality of LEDs.

* * * * *